United States Patent
Klose

(10) Patent No.: US 11,874,105 B2
(45) Date of Patent: Jan. 16, 2024

(54) MEASUREMENT SYSTEM AND METHOD FOR MEASURING A MEASUREMENT OBJECT, IN PARTICULAR A PLASTIC PROFILE

(71) Applicant: INOEX GMBH INNOVATIONEN UND AUSRÜSTUNGEN FÜR DIE EXTRUSIONSTECHNIK, Melle (DE)

(72) Inventor: Ralph Klose, Melle (DE)

(73) Assignee: INOEX GMBH INNOVATIONEN UND AUSRÜSTUNGEN FÜR DIE EXTRUSIONSTECHNIK, Melle (DE)

( * ) Notice: Subject to any disclaimer, the term of this patent is extended or adjusted under 35 U.S.C. 154(b) by 274 days.

(21) Appl. No.: 17/311,134

(22) PCT Filed: Dec. 6, 2019

(86) PCT No.: PCT/DE2019/101055
§ 371 (c)(1),
(2) Date: Jun. 4, 2021

(87) PCT Pub. No.: WO2020/114561
PCT Pub. Date: Jun. 11, 2020

(65) Prior Publication Data
US 2021/0381828 A1 Dec. 9, 2021

(30) Foreign Application Priority Data
Dec. 7, 2018 (DE) .......................... 102018131370.5

(51) Int. Cl.
*G01B 15/02* (2006.01)
*G01B 15/04* (2006.01)
(Continued)

(52) U.S. Cl.
CPC ............. *G01B 15/02* (2013.01); *G01B 15/04* (2013.01); *G01S 3/26* (2013.01); *G01S 13/9027* (2019.05)

(58) Field of Classification Search
None
See application file for complete search history.

(56) References Cited

U.S. PATENT DOCUMENTS 4,075,555 A * 2/1978 Wight .................... G01R 25/02
342/22
5,420,589 A * 5/1995 Wells .................. G01S 13/0209
342/22
(Continued)

FOREIGN PATENT DOCUMENTS

CA 3008687 6/2017
CN 105785368 7/2016
(Continued)

OTHER PUBLICATIONS

International Search Report and Written Opinion for PCT/DE2019/101055 dated Mar. 16, 2020.
(Continued)

*Primary Examiner* — Bernarr E Gregory
(74) *Attorney, Agent, or Firm* — Barnes & Thornburg LLP

(57) ABSTRACT

The present disclosure relates to a measuring system for measuring a measured object, in particular a plastic profile, said measuring system comprising:
 an antenna arrangement of THz transceivers each at times actively emitting a THz transmission beam and passively receiving reflected THz radiation,
 where said antenna arrangement outputs measuring signals of the measurements of the THz transceivers,
 an adjustment means for adjusting the antenna arrangement into several measuring positions along an adjustment direction, (Continued)

Figure 1:
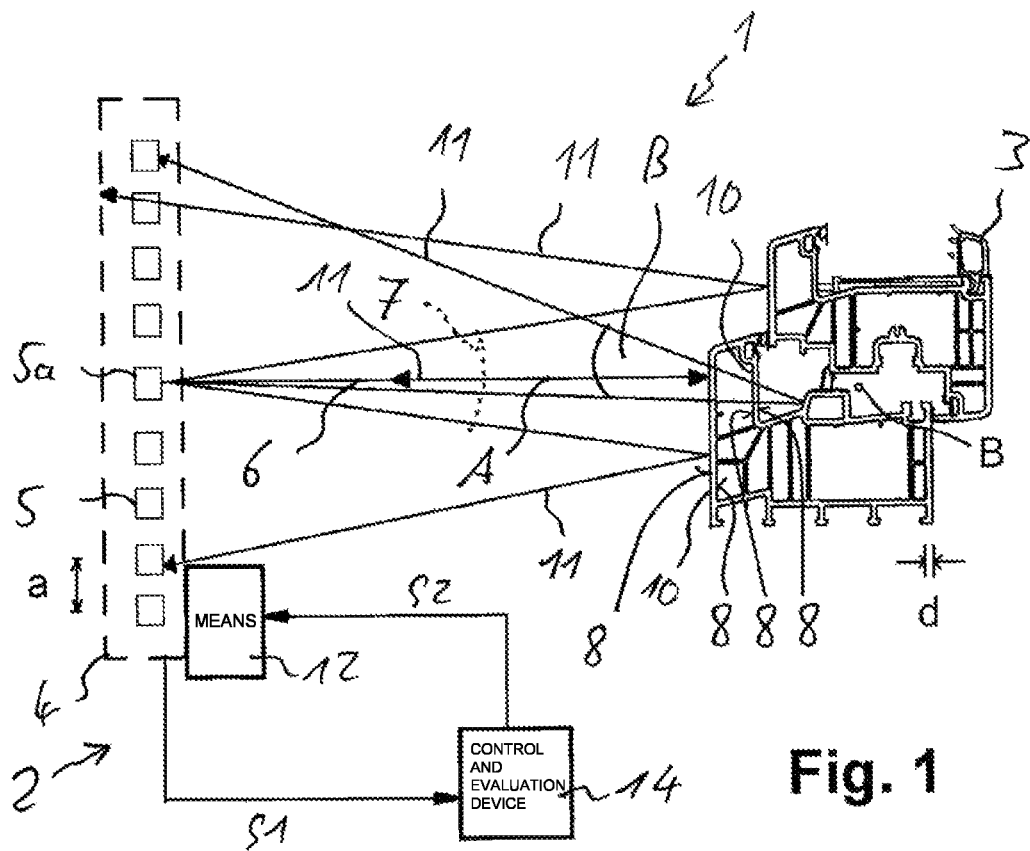

a control and evaluation device for receiving and evaluating the measuring signals which is configured such that the measuring signals are evaluated by means of a synthetic aperture radar evaluation process and a virtual model of the boundary surfaces of the measured object is created, and subsequently the control and evaluation device determines layer thicknesses between the boundary surfaces from the virtual model.

15 Claims, 3 Drawing Sheets

(51) Int. Cl.
G01S 13/26 (2006.01)
G01S 13/90 (2006.01)
G01S 3/26 (2006.01)

(56) References Cited

U.S. PATENT DOCUMENTS

| | | | |
|---|---|---|---|
| 5,796,363 A * | 8/1998 | Mast | G01S 13/89 342/197 |
| 2002/0130804 A1* | 9/2002 | McMakin | G01S 7/41 342/60 |
| 2004/0140924 A1* | 7/2004 | Keller | G01N 21/3581 342/179 |
| 2014/0070111 A1 | 3/2014 | Rappaport et al. | |
| 2018/0143311 A1 | 5/2018 | Melamed | |
| 2020/0184027 A1* | 6/2020 | Dolan | G01S 13/89 |

FOREIGN PATENT DOCUMENTS

| | | |
|---|---|---|
| CN | 106142514 | 11/2016 |
| DE | 102011051071 A1 | 12/2012 |
| DE | 102012100745 A1 | 8/2013 |
| DE | 102014214046 B3 | 10/2015 |
| DE | 102016111044 | 12/2017 |
| JP | 2005083814 | 3/2005 |
| JP | 2012225718 | 11/2012 |
| JP | 2014517253 | 7/2014 |
| JP | 2016170168 | 9/2016 |
| JP | 2018124235 | 8/2018 |

OTHER PUBLICATIONS

Bessem Baccouche, et al., "Three-Dimensional Terahertz Imaging with Sparse Multistatic Line Arrays", IEEE Journal of Selected Topics in Quantum Electronics, vol. 23, No. 4, Jul./Aug. 2017.

Jubo Hao, et al., "Three-Dimensional Imaging of Terahertz Circular SAR with Sparse Linear Array", MDPI Sensors, Jul. 3, 20181.

Gabriel Kniffin, et al., "Parabolic Equation Methods for Terahertz 3-D Synthetic Aperture Imaging", IEEE Transactions on Terahertz Science and Technology, vol. 6, No. 6, Nov. 2016.

* cited by examiner

MEASUREMENT SYSTEM AND METHOD FOR MEASURING A MEASUREMENT OBJECT, IN PARTICULAR A PLASTIC PROFILE

CROSS REFERENCE TO RELATED APPLICATIONS

This application is a U.S. national stage application under 35 U.S.C. § 371(b) of International Application No. PCT/DE2019/101055 filed Dec. 6, 2019, which claims priority to German Patent Application No. 102018131370.5 filed on Dec. 7, 2018, the disclosures of both of which are hereby expressly incorporated by reference in their entirety.

Generally, plastics products are checked for wall thicknesses after manufacturing; in particular, in the case of extrusion, parameters of the plastics product may change and deformations of the still soft plastics material may appear as well as impurities or cavities may be formed. Hereby, it is known to measure measured objects made from a plastics material by means of a terahertz measuring procedure after manufacturing. Hereby, generally, a THz transmission beam is irradiated perpendicular onto the respective measured object and is partially reflected on boundary surfaces so that the boundary surfaces can be determined as measuring peaks from the reflection radiation re-radiated towards a THz transceiver; thereby, it is possible to determine the layer thicknesses, in particular even multiple layer thicknesses, directly from the measuring signal. Hereby, the THz transmission beam may be made time based, frequency modulated, or pulsed. Aside from using a single THz transceiver, phased array arrangements are known also, where e.g. a central THz transmitter emits the THz radiation in a cone of radiation emitted and the reflected THz radiation is detected by receivers of the array arrangement. Thus, by synchronising the transmitter and the receivers, it is possible to determine run times, and, thus, by means of the shifted arrival of the wave front at the receivers, it is possible to evaluate the angle of the incident wave so that distance and position of the source of the reflection in space can be determined.

Generally, it is possible to measure e.g. an extruded plastic pipe or a simple plastic profile using a THz sensor with relatively little effort so as to check the layer thicknesses. Thus, e.g. a pipe or profile can be fully penetrated by radiation from one or more measuring positions and one measuring peak can be determined on each of the several boundary surfaces. Hereby, a relatively small number of measuring positions is required, e.g. by means of adjusting the sensor or by arranging several sensors around the measured object.

Thus, regulating systems of extrusion methods are known also in which the extrusion installation can be controlled in accordance with the determination of layer thicknesses so that a determined main layer thickness, e.g. the wall thickness of a pipe, can be used for controlling purposes.

More complex shaped bodies, including e.g. profiles having a plurality of bars and walls to form several chambers or even e.g. profiles having sealing lips, however, generally cause problems.

Furthermore, in general, it is known to utilise active phased array arrangements in which the array arrangement comprises a plurality of THz transceivers each actively emitting THz radiation at certain times and detecting reflected radiation, and, at other times, merely passively detecting radiation transmitted by another THz transceiver and reflected. Thus, owing to the multiplicity of different transmitters and receivers of such a multiple-in-multiple-out (MIMO) arrangement, it is possible to evaluate a plurality of reference surfaces.

Moreover, in principle, radar measuring methods are known utilising a synthetic radar aperture (SAR). Hereby, a radar sensor is moved along a measured object and measuring images or measuring signals are taken continuously during such movement. Such SAR determinations are made, in particular, from flying objects such as airplanes or satellites and allow for a two-dimensional representation of a terrain segment. Hereby, the sensor transmits always using a sufficiently wide cone of radiation emitted so that the cones of radiation emitted from the various measuring positions overlap. Since the measuring positions of the transmitter are known, in particular in the case of an adjustment direction (azimuth direction) passing the measured object, the measured images overlap at known measuring positions. Thus, the object in the target area is irradiated under variating angles of view and detected accordingly. Based on the intensity and phase position of the received radar echoes it is possible to synthetize the aperture of a large antenna thereby attaining a high spatial definition and motion direction of the antenna. Hereby, a radar signal processor or a control and evaluation device respectively can combine the individual amplitudes and phase positions with one another in such a way that a larger image is synthetized as a virtual model, i.e. height profile. The SAR evaluation algorithms may also serve to correct the phases of the received signals, thereby also correcting run time differences between individual antenna positions and thereby taking into consideration the trigonometric circumstances. Hereby, run time differences can be measured as phase differences.

Thus, the invention is based on the object of creating a measuring system and a method for measuring a measured object allowing for a precise determination even of complex measured objects with relatively little expenditure.

This task is solved by a measuring system and a method according to the independent claims. The sub-claims describe preferred further developments. The measuring system according to the invention is provided, in particular, for carrying out the method according to the invention; the method according to the invention may be carried out, in particular using the measuring system according to the invention.

Further, a measuring arrangement is created made of the measuring system and the object to be measured. Also, a method for manufacturing a plastic profile is created in which the measuring method is utilised.

Thus, an active phased array method or multiple-in-multiple-out-method respectively, where the individual THz transceivers of an antenna matrix each are active and passive at times, is combined with an SAR measuring method; this is based on the idea that SAR measuring methods as radar methods are known already in a corresponding frequency range of e.g. around 10 GHz so that, in principle, the evaluation methods or, respectively, SAR super resolution algorithms tried and tested in that context can also be utilised for radiation in the THz frequency range which may range e.g. from 10 GHz to 50 THz. Moreover, SAR measurements in which the radar beams scan a surface of e.g. a landscape are already used to determine reflection peaks of the reflected radiation. When THz measuring measured objects made of transparent material with differing refraction index, in particular plastic products, reflection peaks are generated, too, because upon penetrating through a boundary surface the THz radiation is reflected e.g. at 2 to 7%, e.g. 5%, of the intensity so that the reflection peaks can be evaluated according to the reflection peaks of a height radar. Because, upon penetrating a measured object having several boundary surfaces, the measuring peaks in the measuring signal appear successively, it is possible to allocate the individual measuring peaks to the various boundary surfaces.

Relevant frequency ranges are, in particular as lower frequency limit 10 GHZ, in particular also 20 GHZ or 50 GHZ, where measurements may be carried out also e.g. at 80 GHZ. As upper frequency limit e.g. 50 THz is relevant, also e.g. 20 THz or 10 THz, i.e. a frequency range of e.g.

[10 GHz, 20 GHz, 50 GHZ; 10 THz, 20 THz, 50 THz].

Owing to the combination of a measuring signal with active phased array, i.e. synchronised THz transceivers in a multiple-in-multiple-out-measuring system, and an adjustment to several measuring positions with overlap of the so determined measuring signals with an SAR evaluation, it is possible to simulate a phased array antenna with a larger aperture and to generate a high-definition image as a virtual model.

As adjustment motion, in particular, a pivot movement or a circulatory motion of the antenna array about the axis of symmetry in with the measured object is positioned may be carried out. Thus, the adjustment motion of the antenna array about the axis of symmetry supplies known measuring positions as position information for an SAR evaluation algorithm. By means of such a pivoting movement, where in each case the optical main axis of the antenna array is directed perpendicular onto the axis of symmetry, it is also guaranteed that the various, sometimes multi-faceted surfaces of the measured object can be scanned in a reflection signal at least at times, in particular also by means of the high angular resolution of the active phased array arrangement with successive actively and passively acting THz transceivers. Thus, in general, it is possible to scan any surface at least at certain times; preferably, the optical main axis of the antenna matrix may even be aligned perpendicular to each surface.

Thus, with every measurement, reflection peaks can first be determined in an appropriate measuring position and subsequently superimposed by the SAR evaluation procedure.

Hereby, the measurement using a phased array and a rotary motion about the measured object with SAR evaluation collaborate in a special manner:

Thus, it is not only the several measurements in the measuring positions around the measured object that can be evaluated by an SAR evaluation procedure but also already the individual measurements of the THz transceivers of a phased array measurement, i.e. the measurements in each matrix position. Because, advantageously, the transmission cones of the individual THz transceivers of a phased array measurement overlap already before the measured object, there will be an overlap of the transmission cones on the measured object; thus, the successive individual measurements of the THz transceivers of a phased array arrangement in each measuring position represent measurements made from slightly displaced measuring positions. The subsequent adjustments of the phased array to further measuring positions, in particular around the measured object, will then supply further THz measurements which in turn each also include a plurality of successive individual THz measurements of each matrix position. All measurements can be processed by an SAR evaluation. Thus, the SAR evaluation can detect the individual THz measurements of each matrix position of a phased array arrangement, and this will be in an adjustment around the measured object so that a large number of individual signals can be processed.

Thus, it is possible to each determine high definition partial segments of the measured object, in particular a plastic profile. Using the reconstruction evaluation procedure of an SAR procedure it is possible afterwards to superimpose the partial segments to create a common virtual model of the profile.

Then, the wall thicknesses may be computed from this virtual model in that the reference surfaces in the virtual model are detected and layer thicknesses or, respectively, wall thicknesses are determined as distances of these boundary surfaces. The thickness of chambers, too, can be detected accordingly as layer thickness of the air layer between walls. Thus, advantageously, differing from known systems, the layer thickness is determined not directly from the measuring signal but, rather, first the reference surfaces are determined by the SAR evaluation procedure of the phased array measurements in a virtual model and the layer thicknesses are determined here from.

Thus, it is also possible to measure e.g. plastic profiles having a plurality of sometimes angular bars and walls.

Moreover, in particular, it is also possible to measure areas of the measured object such as e.g. sealing lips of plastic profiles which sometimes have no parallel plane boundary surfaces and sometimes are curved or angular in shape. With such sealing lips a direct measurement using a THz measuring device from one measuring position is generally not possible or insufficient. Thus, the method according to the invention enables the representation of such a sealing lip in the virtual model to be detected and a reference thickness to be determined.

In particular, it is apparent here that the use of THz transceivers, i.e. combined transmitter and receiver devices, enables the particular combination of the various measuring functionalities and thereby contributes to generating a virtual model.

Thus, according to the invention, are measuring and simulation of profiles, in particular profiles having one or more (more than one) cavities or chambers respectively, becomes possible, which is advantageously significantly more complex than e.g. pipes or continuous strands. Thus, such measuring can be carried out in accordance with the invention in a continuous and/or steady conveyance process of the profile, e.g. directly upon being manufactured, in particular extruded.

Thus, it is also possible to create an extrusion method wherein such a reference thickness of e.g. a sealing lip is determined using the measuring method according to the invention and subsequently the extrusion is adjusted by appropriate control signals from the measuring device in such a way that it is set to a target formation, e.g. a target reference thickness of the sealing lip.

Figure 2:
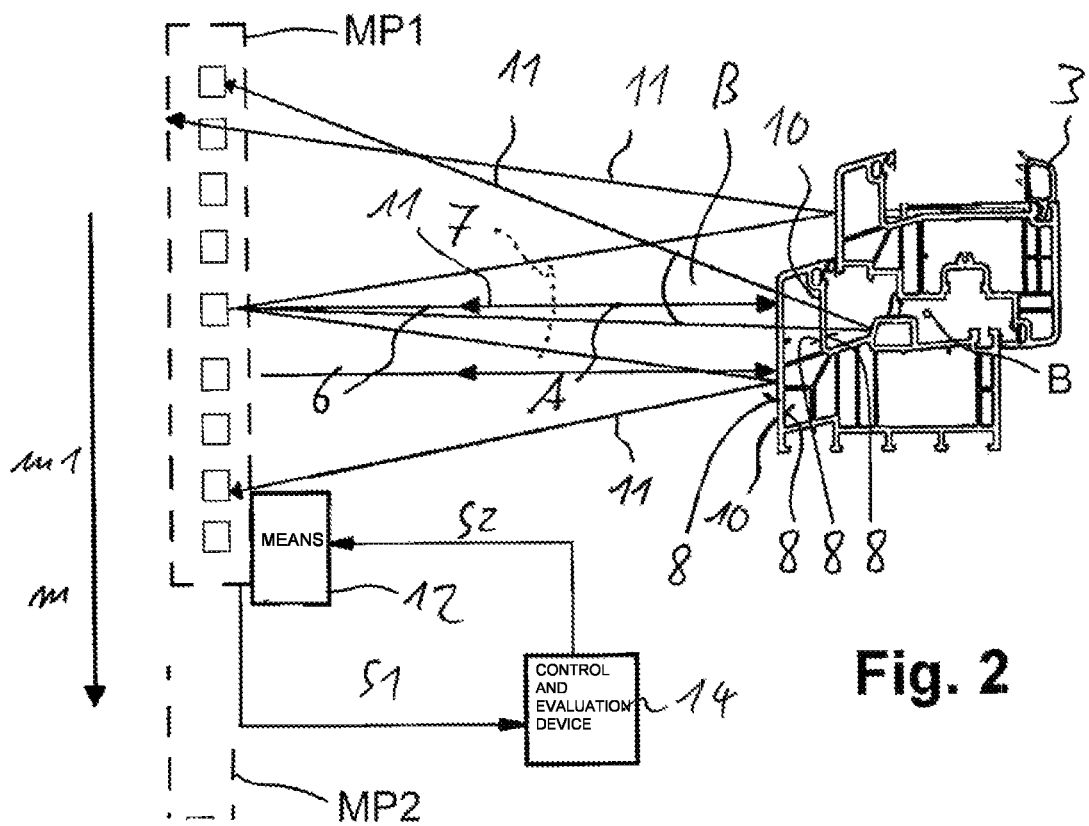
Figure 3:
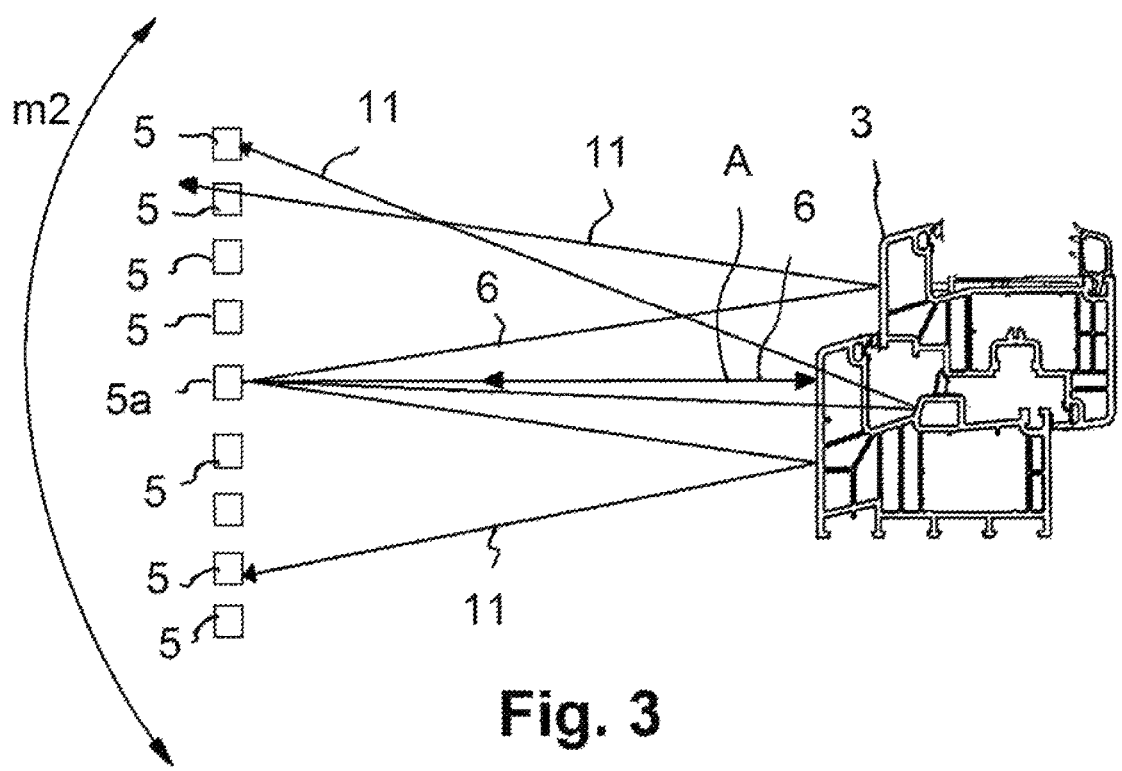
Figure 4:
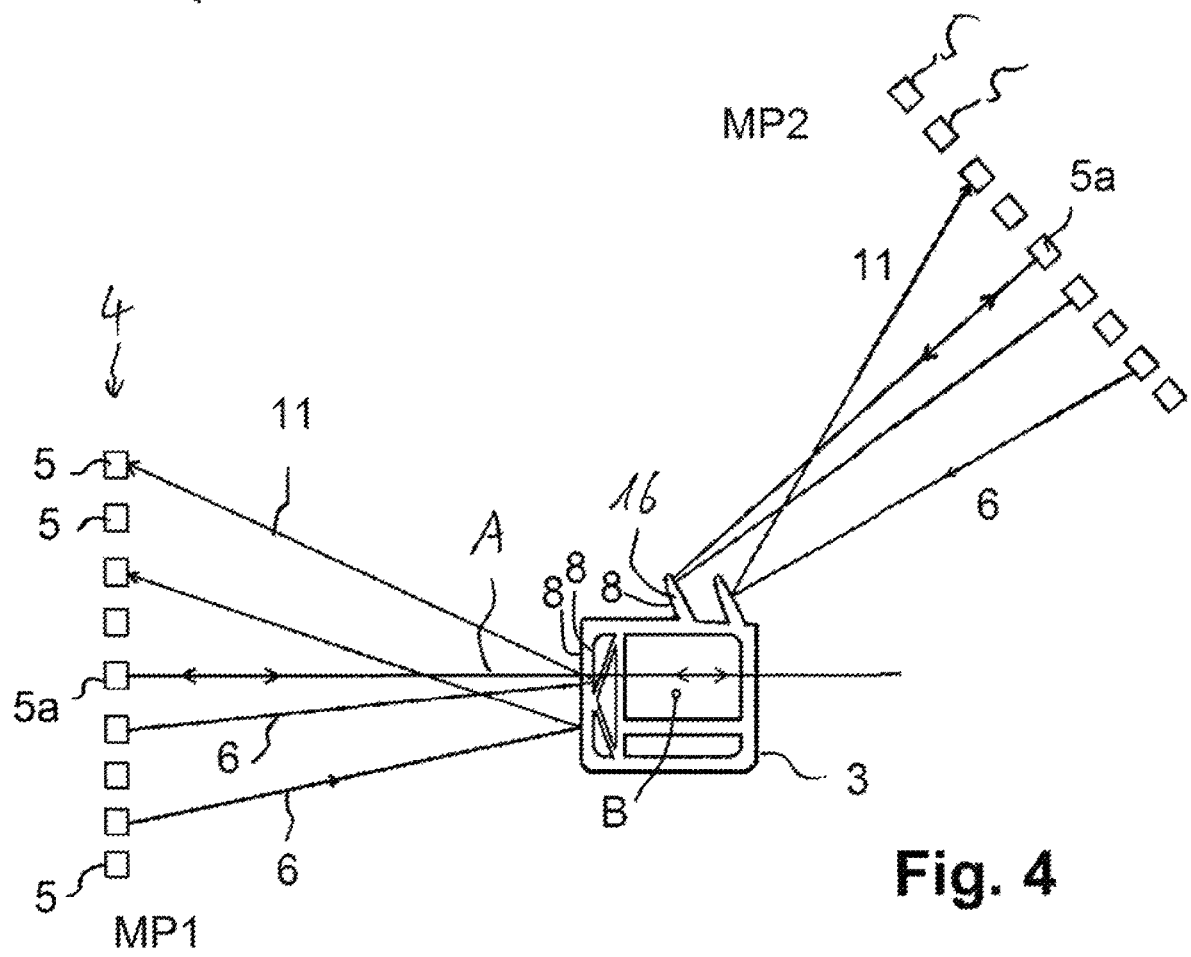
Figure 5:
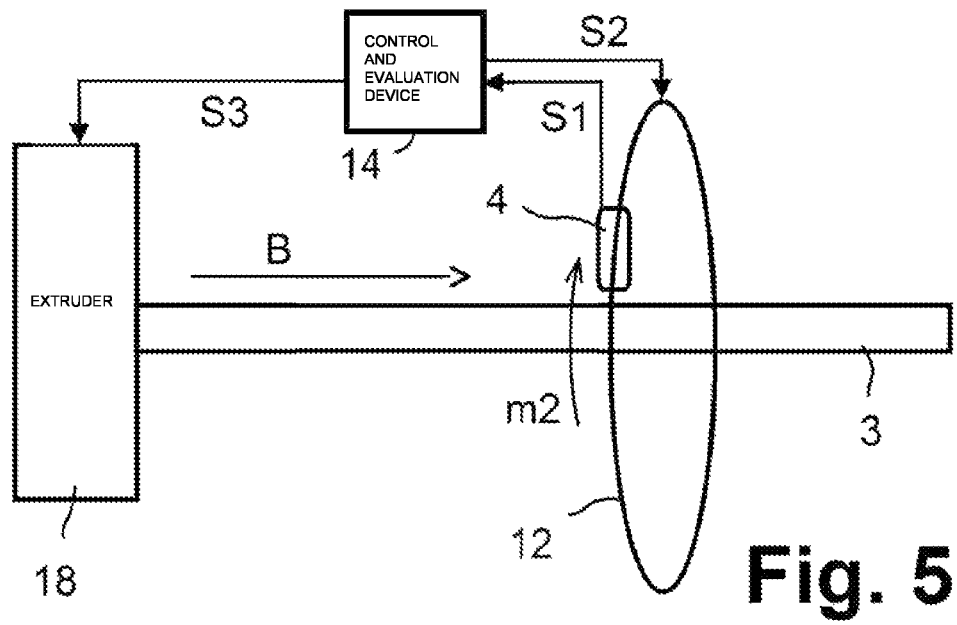
Figure 6:
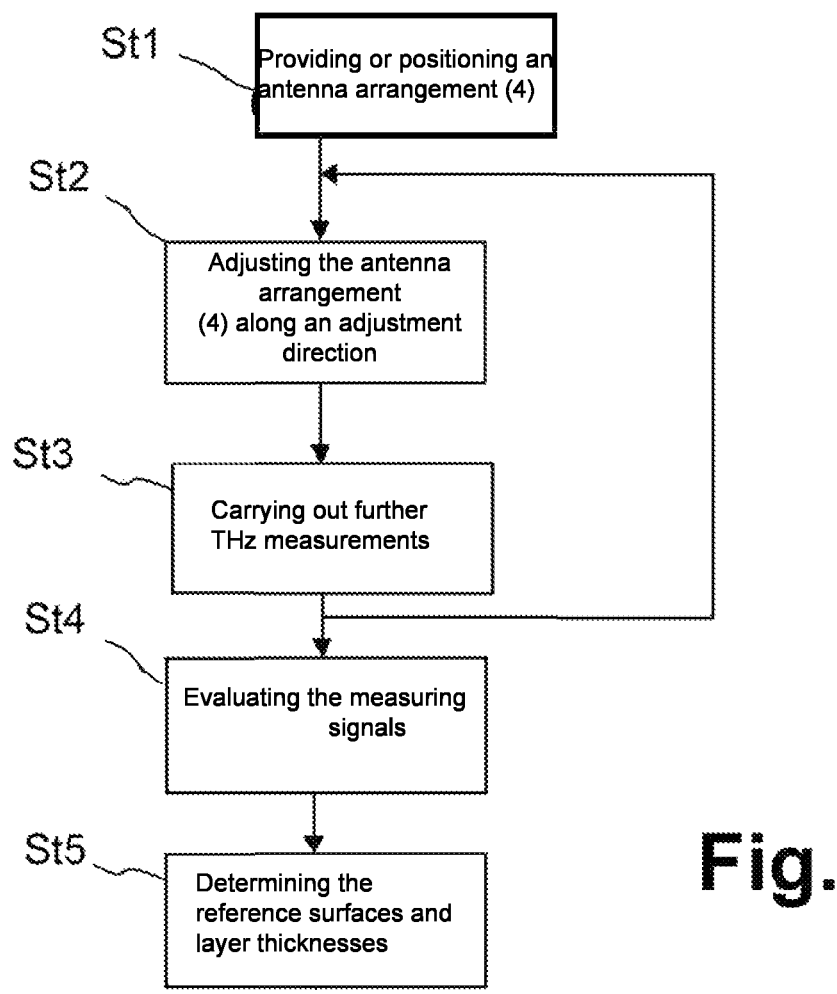

The invention will be illustrated below by means of the accompanying drawings in the example of certain embodiments:

It is shown in:

FIG. 1 a measuring system according to an embodiment of the invention for measuring a measured object;

FIG. 2 the measuring system from FIG. 1 in the case of translational adjustment of the antenna matrix;

FIG. 3 a representation corresponding to that of FIG. 2 in the case of pivoting the antenna matrix;

FIG. 4 the measuring system in various measuring positions of the antenna matrix when measuring a further measured object;

FIG. 5 a production line with extruder and measuring system,

FIG. 6 a flow chart of a method according to the invention.

In a measuring arrangement 1 a measuring system 2 for measuring a measured object 3 is provided. The measuring system 2 comprises an antenna matrix 4 having a matrix array, i.e. in particular two-dimensional regular arrangement, made of THz transceivers 5 auf. As shown, in particular, with regard to the middle THz transceiver 5a, each THz transceiver 5 emits a THz transmission beam 6 along an optical axis A having a transmission cone 7. The THz transmission beam lies, in particular, within the frequency range of 0.01 to 50 THz, in particular 0.02 or 0.05 to 10 THZ or 20 THz. In this embodiment, the THz transceivers 5 are designed to be fully electronic, i.e. as dipole antennas. Hereby, the THz transmission beam 6 may be transmitted as frequency modulated but also e.g. in time domain spectroscopy (TDS) or pulsed respectively. Thus, according to FIG. 1, the THz transceiver 5a transmits the THz transmission beam 6 along the optical axis A towards the measured object 3.

In this embodiment, the measured object 3 is a plastic profile and shown in its cross-section. Advantageously, it is extruded and exhibits a plurality of boundary surfaces 8 that are generally boundary surfaces of tie bars 10 or walls of the plastic material as opposed to outside space filled with air or interior chambers 9 filled with air or a gas.

The THz transmission beam 6 is partially reflected each upon entering and existing the boundary surfaces 8, whereby e.g. 5% of the intensity or amplitude are reflected with the major part of the THz transmission beam 6 continuing its path through the plastic profile 3. Thus, in FIG. 1, e.g. the two depicted bars 10 with their boundary surfaces 8 will each reflect the THz transmission beam 6 along the optical axis A back to the middle THz transceiver 5a which consequently detects measuring peaks in the back reflected THz radiation 11 formed by the boundary surfaces 8 enabling it e.g. to detect the distance of the measured object 3 or, respectively, the first boundary surface 8 to the THz transceiver 5a, the layer thicknesses of the bars 10a, 10b and the width of the chamber 9 between the boundary surfaces 8.

A major part of the boundary surfaces 8 of the plastic profile 3 does not lie perpendicular to the optical axis A so that THz radiation 11 reflected on these will be reflected back under a larger angle of reflection β that cannot be detected by the THz transceiver 5a itself. Some boundary surfaces 8 will reflect the THz radiation 11 under such a small angle of reflection β that the THz radiation 11 will be reflected back to one of the other THz transceivers 5 of the matrix array 4. Because the other THz transceivers 5 of the matrix array 4 are synchronised with the middle THz transceiver 5a the so received measuring peaks of the reflected THz radiation can be related to the THz transmission beam 6 of the middle THz transceiver 5a. Thus, the THz transceivers 5 serving as receivers will receive the reflected THz radiation 11 or, respectively, the reflected waves and can attribute them to the THz transmission beam. The wave fronts will each arrive at the adjacent or, respectively, successive passive, in this case, THz transceivers 5 at different times so that, from the temporal shift or, respectively, the point in time of registering the measuring peak and, further, the angle of reflection β of the reflected THz radiation 11 in relation to the THz transmission beam 6, the distance and position of the source of the reflection, i.e. the respective boundary surface 8 of the plastic profile 3, can be determined.

Thus, by virtue of such measurement in accordance with the antenna matrix principle, it is possible to detect not only exactly perpendicular boundary surfaces 8 but also boundary surfaces 8 that extend slightly angular in relation to the optical axis A.

Moreover, according to FIG. 2, it is provided that not only a specific THz transceiver but all THz transceivers 5 of the matrix array 4 are active at times and passive at times; the respectively active THz transceiver 5 each emits a THz transmission beam 6 along its optical axis A having a corresponding cone of radiation emitted 7 or opening angle respectively, and all other THz transceivers 5 will the each be passive and detect the reflected THz radiation 11, with synchronisation of the times of emission. Thus, all receivers also act as transmitters, i.e. a multiple-in-multiple-out-measuring array is formed in which a larger surface can be scanned in one go, namely, in particular, corresponding to the area of the entire matrix array 4.

Thus, boundary surfaces 8 with a slightly larger inclination or, respectively larger angle relative to the main optical axis A can already by scanned and attributed. The so attainable maximum angle or inclination angle respectively of the boundary surfaces 8 depends, in particular, on the size of the matrix array 4. Further, the spatial resolution is limited by the distance a of the THz transceivers 5 in relation to one another.

Therefore, according to a further advantageous embodiment, as indicated by the arrow FIG. 2, the matrix array 4 is adjusted by an adjustment means 12 along an adjustment direction m (azimuth direction) in relation to the measured object 3, in this case, e.g., first in a linear translational manner. Hereby, a synthetic radar aperture (SAR) is formed in which the THz transceivers 5 each carry out measurements as multiple-in-multiple-out configuration with alternating active transmitter function and receiver function of the plurality of THz transceivers 5, whereby the measurements are processed by super resolution algorithms. Thus, in the case of a stationary measured object 3 and known adjustment movement of the antenna matrix 4 along the der adjustment direction m, the positions of the measured object 3 relative to the respective measuring positions of the antenna matrix 4 in the adjustment movement are known so that a corresponding evaluation by an SAR algorithm is made possible.

While in a classic SAR each THz transceiver 5 firstly detects and processes the perpendicular boundary surfaces 8 of the measured object 3, here, the synthetic radar aperture (SAR) is combined with the MIMO measuring principle of the respectively active and passive THz transceivers 5 of the matrix array 4. Thus, it is possible already to generate a highly exact image with high resolution angles and position data.

The individual THz transceivers 5 of the matrix array 4 supply measuring signals S1 to a control and evaluation device 14 which evaluates the measuring signals S1 accordingly. Thus, the MIMO design according to FIG. 2 makes it possible to apply the synchronisation data in the control and evaluation device 14, taking into account the distances a of the THz transceivers 5 in the two-dimensional matrix array 4 and the synchronisation of the respective times of transmission. The control and evaluation device 14 further controls the adjustment means 12 by means of control signals S2 for adjusting the measuring positions of the antenna matrix 4 in relation to the stationary measured object 3.

According to FIG. 3, a pivoting movement of the matrix array 4 designed as MIMO is provided, in particular, a pivoting movement m2 around the measured object 3. The matrix array 4 may be rotated e.g. about 180° around the measured object 3 or even fully circumferentially, e.g. in a circular motion around the measured object 3. Hereby, it presents essentially no problem if the measured object 3 does not lie exactly in the centre of the circular movement or the pivot axis of the circular motion because, according to the invention, it is recognised that, owing to the pivoting motion and the so generated plurality of different positions of the individual THz transceivers 5 in relation to the measured object 3 and its various boundary surfaces 8, a very high resolution is achieved already, and with irregular measured objects 3 the definition of an axis of symmetry will sometimes be unclear anyway. In the pivoting motion according to FIG. 3, each boundary surface 8 of the measured object 3 will be scanned multiple times depending on its respective orientation, whereby they it will eventually be standing perpendicular to one of the THz transceivers 5 of the matrix array 4 serving as MIMO SAR array so that in this measuring mode each boundary surface 8 will be scanned and detected. Advantageously, the boundary surfaces 8 are scanned multiple times allowing the measurements to be averaged. Thus, the boundary surfaces 8 are scanned by the MIMO arrangement in a wider angle region than merely in the perpendicular case.

Thus, an SAR measurement, which in principle is designed only for perpendicular surfaces, is broadened by the antenna array 4 with additional MIMO arrangement.

Thus, the control and evaluation device 14 is able to establish a data base of high resolution partial segments of the profile in a storage device 15, and subsequently assemble a complete virtual model VM of the measured object 3 from this data base using appropriate reconstruction algorithms, in this case a more complex plastic profile, from which the layer thicknesses are then determined.

FIG. 4 shows a corresponding measurement of another measured object 3, here, in particular, exhibiting irregular shaped sealing lips 16. The irregular boundary surfaces 8 thereof can first be remodelled accordingly by the MIMO SAR adjustment and signal detection and then measured in the model. Thus, it is possible, in particular, to determine a specific parameter of the sealing lip 16, e.g. a reference thickness d_ref defined at a certain point, and compare it to a target value.

Thus, in particular, also in accordance with FIG. 5, it is possible to regulate the extrusion process, wherein the system is adjusted not to a directly measured thickness or wall thickness but the so determined reference thickness d_ref is used for an adjustment, where the control and evaluation device 14 puts out control signals S3 to the extruder 18 for forming the plastic profile 3 so that the extruder 18 adjusts the feed of extrusion material depending on the control signals S3 rather than making an adjustment e.g. to a layer thickness determined directly in a measuring signal.

FIG. 6 shows a flow chart of a method according to an embodiment of the invention. According to step St1, a matrix array 4 is positioned in a measuring position MP1 so that its main optical axis A, i.e. the optical axis A of the middle transceiver 5a, is directed onto the measured object 3, in this case e.g. a plastic profile. Then, according to step St2, the first measurement is carried out in the measuring position MP1, wherein the THz transceivers 5 successively each actively put out a THz transmission beam 5 and passively detect reflected THz radiation 11.

Further, according to step St3, the measuring arrangement 4 is adjusted successively along the adjustment direction m1 or m2 so that successive measurements are carried out in the various measuring positions MP1, MP2, . . . . Hereby, the adjustment may generally be carried out together with the measurements, whereby the measuring procedures happen relatively quickly compared to the adjustment speed and, therefore, can be essentially carried out in one measuring position each. The measuring loop of the steps St2, St3 is then repeated until measuring signals S1 from all measuring positions have been obtained.

According to step St4, the measuring signals S1 of the matrix array for each measuring position MP1, MP2, . . . are then subsequently evaluated in an SAR evaluation process using reconstruction algorithms so that preferably firstly partial sections of a virtual model and, from these, a complete virtual model VM of the plastic profile 3 is assembled. Then, according to step St5, from this virtual model VM the boundary surfaces 8 and, from these, the wall thicknesses d are determined.

These wall thicknesses d determined, in particular also e.g. of a reference thickness d_ref, can then optionally be used for controlling an extruder 18.

Also, the measured object 3 can be adjusted during the measurement provided that this adjustment speed of the measured object 3 is slower than the adjustment speed m1, m2 of the matrix array 4. Because the matrix array 4 exhibits a two-dimensional extension, it extends not only in the drawing plane of the FIGS. 1-4 but also in the direction of the axis of transport or axis of symmetry of the measured object 3 so that a sufficient length of the profile strand will always be covered. Thus, it is possible to carry out a continuous measuring of an extruded product during manufacturing.

LIST OF REFERENCE NUMERALS

1 measuring arrangement
2 measuring system
3 measured object, e.g. plastic profile
4 antenna arrangement, in particular antenna matrix
5 THz transceiver
5a middle THz transceiver
6 THz transmission beam
7 cone of radiation emitted, transmission cone
8 boundary surface
9 chamber of the plastic profile 3
10 walls, bars
11 reflected THz radiation
12 adjustment means
14 control and evaluation device
16 sealing lip
18 extruder
A optical axis, e.g. of the middle transceiver 5a
B symmetry axis, transport direction of the measured object 3
S1 measuring signal
S2 actuator signal directed at the adjustment means 12
S3 control signal for controlling the extruder 18
MP1, MP2, . . . measuring positions
VM virtual model
a distance of the transceiver 5
d layer thickness
d_ref reference thickness of a sealing lip 16
m1, m2 adjustment directions
β reflection angle
St1 Providing or positioning an antenna arrangement (4)
St2 Adjusting the antenna arrangement (4) along an adjustment direction
St3 Carrying out further THz measurements St4 Evaluating the measuring signals St5 Determining the reference surfaces and layer thicknesses

The invention claimed is:

1. A measuring system for measuring a measured object, said measuring system comprising:
an antenna arrangement made of a plurality of terahertz (THz) transceivers, each at times actively emitting a THz transmission beam and at times passively receive reflected THz radiation,
wherein said antenna arrangement puts out measuring signals of the measurements of the THz transceivers,
an adjustment means for adjusting the antenna matrix into several measuring positions along an adjustment direction,
a control and evaluation device for receiving and evaluating the measuring signals which is configured in such a way that the measuring signals of said several THz transceivers in said several measuring positions are evaluated by means of a synthetic aperture radar evaluation process and a virtual model of the boundary surfaces of the measured object is created, and
subsequently the control and evaluation device determines layer thicknesses between the boundary surfaces from the virtual model.

2. The measuring system according to claim 1, wherein the adjustment means pivots the antenna arrangement along a circumferential path, about an axis of symmetry of the measuring system, whereby in the measurements in the various measuring positions of the circumferential path an optical main axis of the antenna arrangement is each aligned to the axis of symmetry.

3. The measuring system according to claim 1, wherein the antenna arrangement comprises a two-dimensional, arrangement of terahertz (THz) transceivers, in particular at constant distances between the terahertz (THz) transceivers.

4. The measuring system according claim 1, wherein the terahertz (THz) transceiver which currently is actively emitting the terahertz (THz) transmission beam also detects the reflected THz radiation.

5. The measuring system according to claim 1, wherein the terahertz (THz) transceivers each detect terahertz (THz) radiation reflected on boundary surfaces of a measured object as measuring peaks.

6. The measuring system according to claim 1, wherein the terahertz (THz) transceivers each emit terahertz (THz) radiation within a frequency range between one of the following ranges: 0.01 THz and 50 THz, or 0.05 THz and 20 THz.

7. The measuring system according to claim 1, wherein the terahertz (THz) transceivers each emit the terahertz (THz) transmission beam with a transmission cone, wherein at least the transmission cones of adjacent THz transceivers overlap, at least in part, up to the axis of symmetry of the measuring system and/or up to the measured object.

8. The measuring system according to claim 1, wherein the several measuring signals are evaluated by the synthetic aperture radar (SAR) evaluation process with overlap or combination of the amplitudes and the phase positions.

9. A measuring arrangement, comprising
a measuring system according to claim 1 in the axis of symmetry of which a measured object is arranged which has a longitudinal axis extending along or in parallel with the axis of symmetry,
where the adjustment means adjusts the antenna arrangement around the measured object.

10. A measurement arrangement according to claim 9, wherein a conveying means is provided for conveying the measured object along the axis of symmetry or parallel to axis of symmetry.

11. A method for measuring a measured object including at least the following steps:
providing or positioning an antenna arrangement made of a plurality of terahertz (THz) transceivers such that an optical axis of the antenna arrangement is aligned with the measured object and/or perpendicular to an axis of symmetry,
carrying out a first terahertz (THz) measurement of the measured object in the first measuring position, said plurality of terahertz (THz) transceivers of the antenna matrix each at times actively emitting a terahertz (THz) transmission beam along or parallel to its optical axis which is partially reflected from the measured object back to the antenna arrangement,
said THz transceivers at times passively detecting reflected terahertz (THz) radiation,
successively adjusting the antenna arrangement along an adjustment direction into several measuring positions in which the optical axis is aligned with measured object and/or perpendicular to the axis of symmetry, and
carrying out further terahertz (THz) measurements while putting out measuring signals,
evaluating the measuring signals from said several measuring positions, where the measuring signals of the individual terahertz (THz) transceivers are processed together by means of a synthetic aperture radar (SAR) evaluation process and a virtual model of a cross-sectional area of the measured object is determined,
determining the reference surfaces and layer thicknesses as distances of the reference surfaces in the virtual model.

12. The method according to claim 11, wherein the antenna matrix is adjusted to the several measuring positions in such a way that the optical axis is always aligned perpendicular with the axis of symmetry and/or the measured object.

13. The method according to claim 11, wherein the cone of radiation emitted of the individual terahertz (THz) transceivers already overlap, at least in part, before the measured object, and/or the cone of radiation emitted of the measurements in the several measuring positions overlap, at least in part, so as to form a superimposition for the synthetic aperture radar (SAR) evaluation process.

14. The method according to claim 11, wherein the terahertz (THz) transceivers each emit the terahertz (THz) transmission beam through the measured object with partial reflection on the several boundary surfaces of the measured object.

15. The method according to claim 11, the measuring signals are subsequently assembled from multiple-in-multiple-out (MIMO) measurements in each measuring position by means of synthetic aperture radar (SAR) computation method so as to form partial sections of a virtual model and, here from, the entire virtual model of the measured object, where then the layer thicknesses are subsequently determined from the virtual model.

* * * * *